INVENTOR
OLIN L. MACSORLEY
BY Melvin P. Williams
ATTORNEY

United States Patent Office 3,416,132
Patented Dec. 10, 1968

3,416,132
GROUP PARITY HANDLING
Olin L. MacSorley, Beacon, N.Y., assignor to International Business Machines Corporation, Armonk, N.Y., a corporation of New York
Filed Apr. 5, 1965, Ser. No. 445,317
6 Claims. (Cl. 340—146.1)

ABSTRACT OF THE DISCLOSURE

Apparatus for checking the parity of groups of data bits which have been transferred in an offset manner between registers. The offset transfer will cause some bits to cross byte boundaries and some bits to be lost in the transfer. This may cause changes in the parity of individual bytes and/or in the entire word. In the event that the bits lost during the transfer of data are of even parity, the apparatus will cause a group parity error signal to be generated only if parity has changed in an odd number of bytes of data. If the lost bits are of odd parity, then an even number (or no) byte parity changes will produce an error signal.

Figure 1:
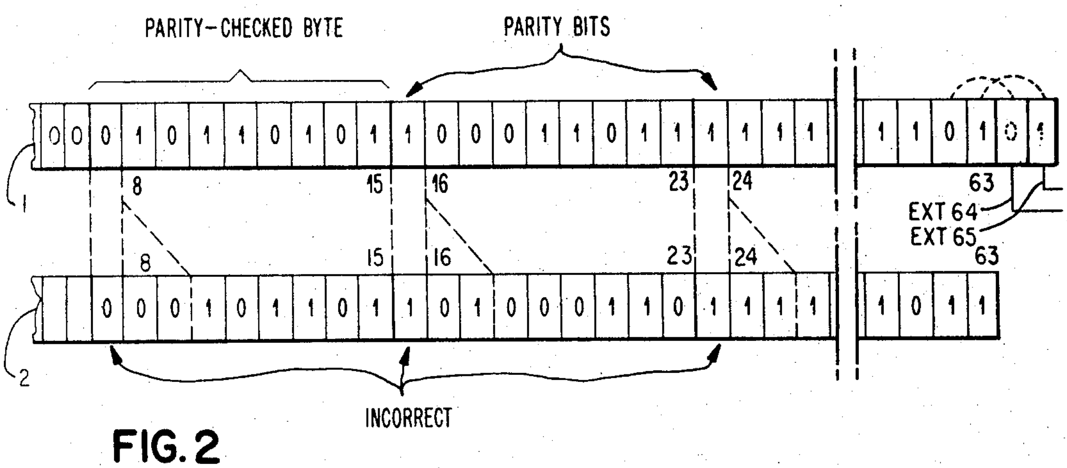

This invention relates to data processing, and more particularly to means for handling vartiations in parity which result from inter-transmission of data between parity checked groups.

In the data processing art, the checking of data by means of a redundant bit, called a parity bit, the inclusion of which within the parity checked group results in a total even or odd count (as defined by the particular parity philosophy of each system) has been utilized with a number of variations for taking into account the alteration of a parity count which results from changing the data content within a parity checked group.

One particular problem which is well known in data processing results when shifting operations are involved. In some cases, parity checking of the input to the shifter together with parity generation and parity checking at the output of the shifter have been provided, and in other cases, these have been accompanied with parity predicting circuits so as to permit checking the result with the predicted parity. In some cases, however, the particular hardware involved in a shifting (or related) operation may render the application of such means impractical, or may create problems in the packaging of actual logic circuits for performing the operation as well as the parity adjustment required thereby.

An object of the present invention is to provide for the parity checking of groups, the data content of which is being altered.

Another object is to provide a simplified means for the checking of parity-oriented groups of data, the content of which is being altered.

A further object of the present invention is provision of a simplified means for checking data manifestations involved in shifting operations.

In accordance with the present invention, there is provided a relatively simple means of checking the parity of groups of data bits, the data content of which is being altered by virtue of a shifting operation which is moving bits from one of said parity checked groups into another of said groups. In accordance with a particular embodiment of the invention, a check of the parity of the groups as shifted is provided, and the correctness or incorrectness of the parity is determined by whether a like result has been achieved in an even number of parity checked groups without regard to whether said like result indicates an error or no error. In particular, error signals resulting from parity checking at the output of a shifting apparatus are paired off such that if no bits (or an even number of bits) are shifted out of the data word an odd number of errors may be taken as an error, an even number of errors may be taken as no error; if an odd number of bits are shifted out of the data word, then an even number of group errors may be taken as an error and an odd number taken as no error. Additionally, when shifting is not being performed, each of the parity checked groups may have its error resolution preserved so as to maintain full parity checking integrity.

This invention provides a relatively simple means of determining whether or not there is a likelihood of error having resulted, following the shifting of data bits as they are passed through a data shifting apparatus; the invention avoids the necessity of duplicate hardware, or complex parity checking capability at the output of a shifting apparatus.

Figure 2:
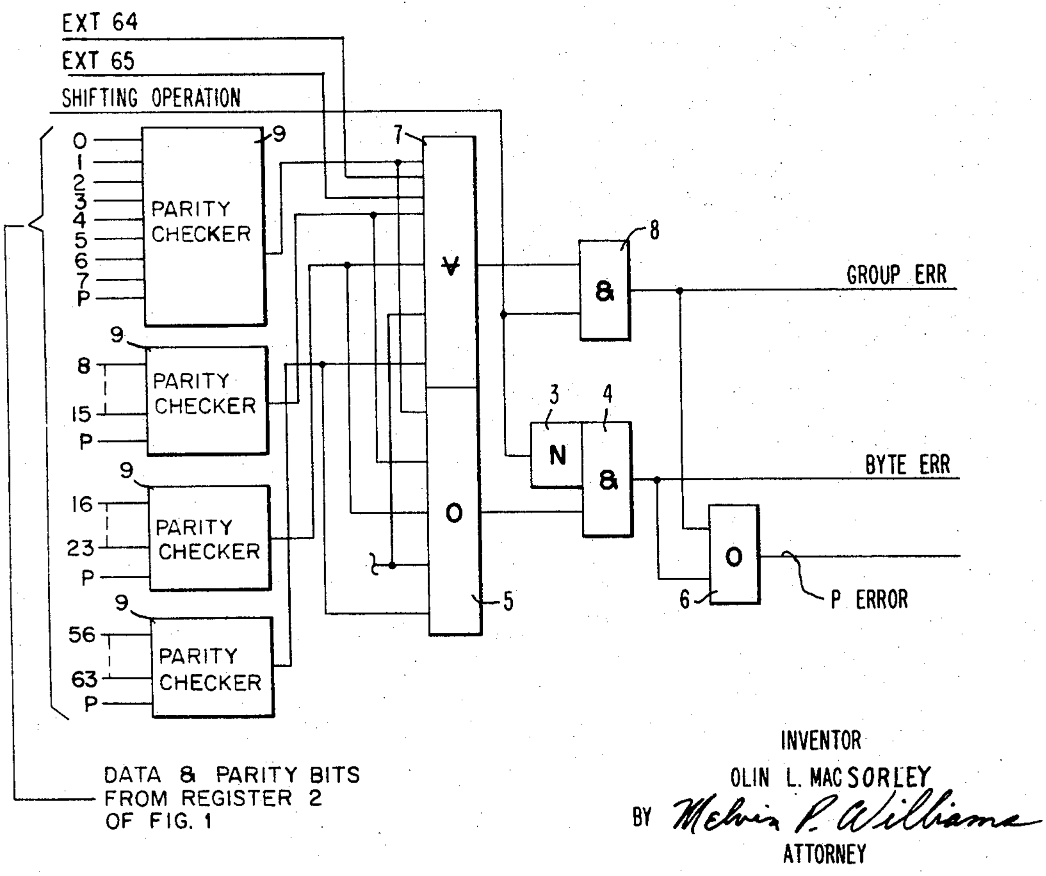

The foregoing and other objects, features and advantages of the present invention will become more apparent in the light of the following detailed description of a preferred embodiment thereof, as illustrated in the accompanying drawings, in which:

FIG. 1 is an illustration of a bit shifting operation wherein the parity content of parity-checked group is changed, and FIG. 2 is an illustrative schematic block diagram of a circuit for performing group parity checking in accordance with the present invention.

The present invention is embodied in a large scale data processing system as illustrated in FIGS. 633–635, 647, and Section 18.11.12.2 of the particular embodiment disclosed in a copending patent application of the same assignee entitled "Large Scale Data Processing System," Serial No. 445,326, filed April 5, 1965, by O. L. MacSorley et al.

Said application has been abandoned and a continuation-in-part thereof, application Serial No. 609,238 was filed on January 13, 1967.

In FIG. 1, a pair of register means 1, 2 are shown to comprise register positions for a plurality of bytes, each byte comprising eight bits and a parity bit. The illustration assumes hardware which can transfer the data contents of register 1 into register 2, with a shift to the right of two bits being accomplished during the transfer. In the transfer, each byte picks up new bits and loses old bits such that the parity count of the bytes is transposed. The particular illustration chosen shows that, even though two bits may be moved out of the byte or two bits may be moved into a byte, the total parity count may change. Furthermore, the parity may change, even though zeros are shifted in merely to fill in a byte. Bits may be shifted out of the word, such as shown with respect to a right extender portion of the register 1 (which contains bits 64 and 65). In each of the bytes in the register 2, parity is incorrect for an odd parity count as shown for the register 1. Thus, FIG. 1 illustrates the problem to which the present invention is addressed.

In the event that the parity of register 2 should be checked in order to provide the degree of checking integrity required in a particular system, suitable means must be provided to perform this checking. Obviously, the exclusive OR of the parity bits with the data bits is not an adequate check in this situation. Each of the bytes illustrated in the register 2 would cause a parity error, and if the parity error were recognized in the usual way, that is, at the byte level, then an indication of machine failure would be given, even though no failure had in fact existed (which is illustrated by the fact that the bits had been properly transmitted, with shifting, from register 1 to register 2).

The circuit of FIG. 2 is an illustrative embodiment of an implementation of the present invention to permit some form of parity checking on the shifted bits shown in register 2. There is provided an exclusive OR circuit (which as used herein is contemplated as an exclusive OR tree, or other odd-count determining circuit) which monitors all of the parity errors for the register 2, it being assumed that parity circuitry (such as a group of parity checkers 9, each of which monitors the parity of one byte of register 2 and produces a signal at its output if said parity does not conform to the prescribed standard) is available at the register 2, and it also monitors the extender of the register 1 so as to determine if either of two possible bits have been shifted out as a result of the exemplary shift of TWO shown in FIG. 1. In the example given, parity errors (resulting from lack of identity between original, unshifted parity, and parity generated after shifting) would show up for byte 8–15 and byte 16–23, as well as other portions of the register 2 which have been broken away for simplicity. In the example given, the parity error for byte 8–15 would be balanced against the parity error for byte 16–23; however, if no other errors showed up for the register 2 (from that portion broken away and not shown herein) then the bit shifted into position 65 would cause the exclusive OR circuit 7 to generate a signal which is fed to an AND circuit 8. If a shifting operation is involved, then the AND circuit 8 will recognize this single error as a group error; on the other hand, if the bit shifted into position 65 is balanced by another error somewhere in register 2 or a second shifted bit (64), then there would be an even number of inputs to the exclusive OR circuit 7, and there would be no input to the AND circuit 8 so there would be no group error signal generated. When shifting operations are not involved, an inverter 3 will permit an AND circuit 4 to recognize errors in the usual way, said errors being sensed by an OR circuit 5. Shifted bits are not involved with byte errors, and are not applied to the OR circuit 5. The OR circuit 5 permits any single byte error to cause the AND circuit 4 to generate a byte error signal. An OR circuit 6 illustrates the fact that the byte error and group error can be OR'ed so as to generate a general parity error indicated on the P error line. Thus, the choice of the exclusive OR circuit 7 or the OR circuit 5 (to feed the OR circuit 6) is made by the "shifting operation" signal, by selecting either of the AND circuits 8, 4. This permits having byte resolution when shifting is not being performed, and word (or multi-byte) resolution of parity checking when shifting is involved.

By means of the invention, of which FIG. 2 is a simplified illustration, the normal byte parity checking circuit which is usually associated with a register such as the register 2 can perform a parity check on the register, even when bit shifting is involved. The bit shifting involved herein may be as a result of a shifting operation as such, or as the result of a divide or multiply iteration which utilizes shifting, or for any other purpose within the data processing system. Even though a bit shift of 2 has been shown with respect to odd parity, it should be obvious that the same rules as are illustrated in FIG. 1 would apply for other shifts, and even parity. The circuit of FIG. 2 is merely illustrative of hardware which may be employed by those skilled in the art to implement the present invention.

Although the invention has been shown and described with respect to a particular embodiment thereof, it should be apparent to those skilled in the art that the foregoing and other changes and omissions in form and details thereof may be made therein without departing from the spirit and scope of the invention.

What is claimed is:

1. In a data processing system which includes means for shifting data bits, a parity checking apparatus, comprising:

a plurality of checking means, each of said checking means associated with a byte of data bits, each of said bytes of data bits including an associated parity bit, each of said checking means providing an error manifestation in the event that the modulo two count of the bits contained in a related byte does not conform to a prescribed standard;

a first collecting means responsive to said checking means, said collecting means operable in response to an error manifestation from any of said checking means so as to generate a conditional byte error signal;

a second collecting means responsive to each of said checking means, said second collecting means operable in response to signals from a number of said checking means, said number of signals being odd or even, respectively, in dependence upon the parity of bits lost as a result of said shifting, said second collecting means operable to generate a conditional group error signal;

gating means for said conditional error signals;

and means responsive to conditions in said system for selectively gating said conditional group error signal or said conditional byte error signal so as to generate a group error signal or a byte error signal, alternatively, in dependence upon the operation involved.

2. The device described in claim 1 wherein an error designation may be generated from either of said group error signal and said byte error signal.

3. In a data processing system, which includes means for shifting data bits, a parity checking apparatus, comprising:

a plurality of checking means, each of said checking means associated with a byte of data bits, each of said checking means providing an error manifestation in the event that the bits contained in a related byte does not conform to a prescribed standard;

a first collecting means responsive to said checking means, said collecting means operable in response to an error manifestation from any of said checking means so as to generate a conditional byte error signal;

a second collecting means responsive to each of said checking means, said second collecting means operable in response to a number of error manifestations, said number depending upon the parity of bits lost as a result of said shifting, to generate a conditional group error signal;

gating means for said conditional error signals;

and means responsive to conditions in said system for selectively gating said conditional group error signal or said conditional byte error signal so as to generate a group error signal or a byte error signal, alternatively, in dependence upon the operation involved.

4. The device described in claim 3 wherein an error designation is generated from either of said group error signal and said byte error signal.

5. In a data processing system which includes a first storage means for storing a first plurality of bytes of data, a second storage means for storing a second plurality of bytes of data, and means for transferring and shifting the contents of said first storage means to said second storage means; parity checking apparatus comprising:

a plurality of checking means, each of said checking means being associated with a byte in said second plurality of bytes of data, each of said checking means having an output whereat an error manifestation is provided in the event that the modulo two count of the bits contained in the related byte does not conform to a prescribed standard;

exclusive-OR means having a plurality of inputs and an output;

the output of each of said checking means being connected to one of the inputs of said exclusive-OR means; and means responsive to the difference in parity between the data bits originally contained in said first storage means and the data bits transferred to said second storage means to cause said exclusive-OR means to produce at its output a parity error signal when the sum of the number of error manifestations and said difference in parity is odd.

6. The parity checking apparatus of claim 5 wherein said last-mentioned means comprises:

storage extension means for storing data bits that are not transferred from said first storage means to said second storage means;

each bit position of said storage extension means being connected to one input of said exclusive-OR means.

References Cited

UNITED STATES PATENTS

| | | | |
|---|---|---|---|
| 3,005,189 | 10/1961 | O'Brien | 340—146.1 X |
| 3,011,073 | 11/1961 | Moyer | 235—153 X |
| 3,045,209 | 7/1962 | Pomerene | 340—146.1 X |
| 3,134,960 | 5/1964 | Mazziotti | 340—146.1 |

MALCOLM A. MORRISON, *Primary Examiner.*

C. E. ATKINSON, *Assistant Examiner.*

U.S. Cl. X.R.

235—153